US009503162B2

(12) United States Patent
Zirwas et al.

(10) Patent No.: US 9,503,162 B2
(45) Date of Patent: Nov. 22, 2016

(54) CONFIGURING A COMMUNICATION CHANNEL BETWEEN A BASE STATION AND A USER EQUIPMENT

(75) Inventors: Wolfgang Zirwas, Munich (DE); Simone Redana, Munich (DE); Bernhard Raaf, Neuried (DE); Michael Faerber, Wolfratshausen (DE)

(73) Assignee: Nokia Solutions and Networks Oy, Espoo (FI)

( * ) Notice: Subject to any disclaimer, the term of this patent is extended or adjusted under 35 U.S.C. 154(b) by 39 days.

(21) Appl. No.: 14/379,580

(22) PCT Filed: Feb. 21, 2012

(86) PCT No.: PCT/EP2012/052895
§ 371 (c)(1),
(2), (4) Date: Aug. 19, 2014

(87) PCT Pub. No.: WO2013/123971
PCT Pub. Date: Aug. 29, 2013

(65) Prior Publication Data
US 2015/0009933 A1    Jan. 8, 2015

(51) Int. Cl.
*H04B 7/02* (2006.01)
*H04B 15/00* (2006.01)
*H04L 5/00* (2006.01)
*H04L 27/26* (2006.01)

(52) U.S. Cl.
CPC ............. *H04B 7/024* (2013.01); *H04B 15/00* (2013.01); *H04L 5/0035* (2013.01); *H04L 5/0091* (2013.01); *H04L 5/001* (2013.01); *H04L 27/2601* (2013.01)

(58) Field of Classification Search
CPC ...................................................... H04B 7/024
See application file for complete search history.

(56) References Cited

U.S. PATENT DOCUMENTS

2010/0074183 A1    3/2010  Chen et al.
2011/0287798 A1*  11/2011  Ono ....................... H04B 7/024
                                                       455/509

OTHER PUBLICATIONS

International Search Report and Written Opinion for International Application No. PCT/EP2012/052895, mailed Nov. 22, 2012, 15 pages.
Prakash Bhat, et al.; "LTE-Advanced: An Operator Perspective"; IEEE Communications Magazine, IEEE Service, Center, Piscataway, US, vol. 50, No. 2; Feb. 1, 2012, pp. 104-114, XP011417046.

(Continued)

*Primary Examiner* — John Blanton
(74) *Attorney, Agent, or Firm* — Brake Hughes Bellermann LLP

(57) ABSTRACT

A method is provided wherein a base station and at least one further base station are assigned to a cooperation area, wherein a user equipment is served by the base station. The method comprises determining, by the base station, whether all user data of the user equipment being required for a precoding coordinated multipoint transmission is received by each of the base station and the at least one further base station, selecting a transmission mode, wherein the transmission mode is based, if all user data of the user equipment being required for a precoding coordinated multipoint transmission is received by each of the base station and the at least one further base station, on precoding coordinated multipoint transmission, or else, on an interference reducing transmission, and configuring, by the base station, the communication channel between the base station and the user equipment based on the selected transmission mode.

20 Claims, 2 Drawing Sheets

(56) References Cited

OTHER PUBLICATIONS

Viveck R. Cadambe, et al.; "Interference Alignment and Degrees of Freedom of the K-User Interference Channel"; IEEE Transactions on Information Theory, IEEE Press, USA, vol. 54, No. 8, Aug. 1, 2008, pp. 3425-3441, XP011231331.

Luca Scalia, et al.; "Power-Efficient Mobile Backhaul Design for CoMP Support in Future Wireless Access Systems"; Computer Communications Workshops, 2011 IEEE Conference on, Apr. 10, 2011, pp. 253-258; XP031949920.

Changho Suh, et al.; "Downlink Interference Alignment"; IEEE Transactions on Communications, Service Center, Piscataway, NJ. USA, vol. 59, No. 9, Sep. 1, 2011, pp. 2616-2626, XP011386471.

* cited by examiner

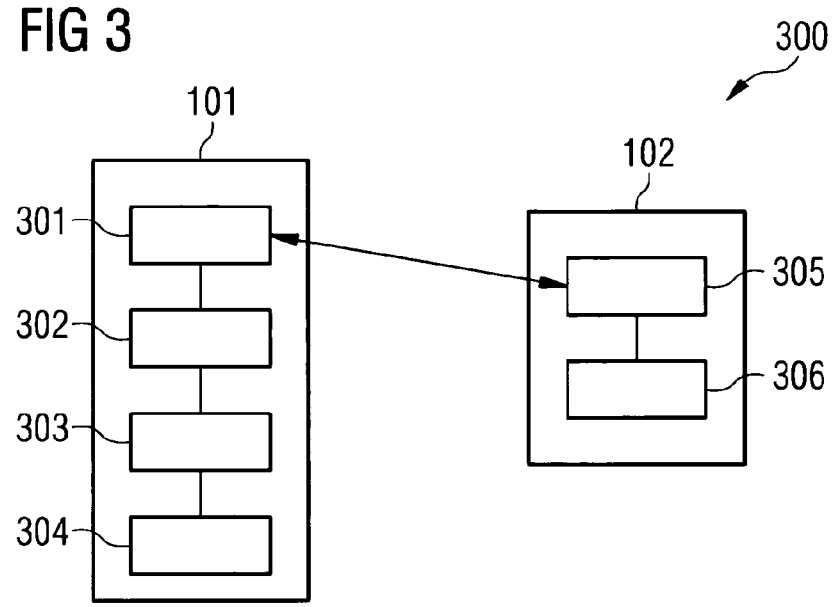

CONFIGURING A COMMUNICATION CHANNEL BETWEEN A BASE STATION AND A USER EQUIPMENT

This application is a national stage entry of PCT Application No. PCT/EP2012/052895, filed on Feb. 21, 2012, entitled "CONFIGURING A COMMUNICATION CHANNEL BETWEEN A BASE STATION AND A USER EQUIPMENT", which is hereby incorporated by reference in its entirety.

FIELD OF INVENTION

The present invention relates to the field of cellular networks, especially to network systems comprising cooperation areas, and in particular to interference mitigation within such networks.

ART BACKGROUND

Modern wireless communication networks often are organized in a cell structure. In LTE (3GPPP Long-Term Evolution), cells may be organized in so called cooperation areas. Cooperation areas (CAs) may be defined by one or more base stations (eNodeBs, eNBs) each serving one or more cells. Within a CA, (joint) precoding coordinated multipoint (JP-CoMP) transmission may be applied for reducing interferences within the CA.

For JP-CoMP, cooperation may be performed over different sites to achieve significant performance gains. For the precoding, all involved eNBs require the channel state information (CSI) as well as the user data for all cooperating users.

From an implementation point of view one main challenge for JP-CoMP is the distribution of huge amounts of user data over the backhaul with ultra short delay. For control information, one can setup a high priority connection providing a high probability to be available at all cooperating eNBs in time. For user data, prioritization is typically not possible or somehow meaning less due to the large amount of data. In that case, there is a certain probability that control information might be available at all eNBs of a so called cooperation area, while the according user data are still blocked somewhere in the backbone network.

One option is to provide over provisioning of the backhaul network to guarantee always that all cooperating eNBs will have all user data available within shortest time and low delay. Sufficient over provisioning in larger areas of the networks is certainly quite costly. Delaying the time instance for which eNBs wait before they start joint transmission will increase the probability that all eNBs have all user data available, even in case of only moderate over provisioning. At the same time larger delay lead to larger feedback outdating for the channel state information (CSI) degrading the performance of joint transmission significantly.

There may be a need for an improved and flexible system and method being adapted to allow a precoding coordinated multipoint transmission (like JP-COMP) and provide a fallback mode during overload of a backbone.

SUMMARY OF THE INVENTION

This need may be met by the subject matter according to the independent claims. Advantageous embodiments of the present invention are described by the dependent claims.

According to a first aspect of the invention there is provided a method for configuring a communication channel between a base station and a user equipment within a cellular network system. The cellular network system comprises a cooperation area, wherein the base station and at least one further base station are assigned to the cooperation area. The user equipment is served by the base station. The method comprises determining, by the base station, whether all user data of the user equipment being required for a precoding coordinated multipoint transmission is received by each of the base station and the at least one further base station. The method further comprises selecting a transmission mode, wherein the transmission mode is based, if all user data of the user equipment being required for a precoding coordinated multipoint transmission is received by each of the base station and the at least one further base station, on precoding coordinated multipoint transmission, or else, on an interference reducing transmission. Furthermore, the method comprises configuring, by the base station, the communication channel between the base station and the user equipment based on the selected transmission mode.

This aspect of the invention is based on the idea to provide the possibility of precoding coordinated multipoint transmission (like joint precoding coordinated multipoint, JP-COMP) if the bases stations have all the user data of the user equipment(s) within the cooperation area (CA). If this is not the case, interference reduction may be based on an interference reducing transmission without having all user data in advance.

Interference reduction as a fallback mode may be performed per base station without having the user data of all other user equipments in the cooperation area (the base stations however have all needed channel information). Thus, it might not be necessary to exchange user data between the base stations.

For a precoding coordinated multipoint transmission, the base stations may have to exchange user data and to precode their transmissions based on these user data. Each base station may use or select the same transmission mode. Each kind of precoding may be used.

CoMP is considered by 3GPP as a tool to improve coverage, cell-edge throughput, and/or system efficiency. The main idea of CoMP is as follows: when a UE is in the cell-edge region, it may be able to receive signals from multiple cell sites and the UE's transmission may be received at multiple cell sites regardless of the system load. Given that, if the signaling transmitted from the multiple cell sites is coordinated, the DL performance can be increased significantly. For the UL, since the signal can be received by multiple cell sites, if the scheduling is coordinated from the different cell sites, the system can take advantage of this multiple reception to significantly improve the link performance.

The term "base station" in this context may denote any kind of physical entity being able to communicate with a user equipment or any other network device. A base station in this context may be any kind of network device providing the required functionality for the method, it may also be a transceiver node in communication with a centralized entity. The base station may be for example a NodeB or eNB.

The described method refers to interference reduction in situations where precoding coordinated multipoint (precoding CoMP) transmissions are present. The idea of the method is to combine a precoding transmission with a more simple interference reducing transmission. Interference reduction also deals with reducing interference but does not require huge amounts of user data, i.e., does not need any exchange of user data between different base stations, as precoding CoMP needs. The main idea is to switch from precoding CoMP to the more simple interference reducing transmission without having user data when the backbone is overloaded and user data is delayed. In effect, interference reducing transmission without user data is used as a fallback option to precoding CoMP.

According to an embodiment of the invention, the precoding coordinated multipoint transmission corresponds to a joint precoding coordinated multipoint transmission (JP-CoMP).

This may refer to a precoding technique which is the same (joint) for all cooperating base stations.

According to a further embodiment of the invention, the interference reducing transmission corresponds to interference alignment.

Interference alignment is a linear precoding technique that attempts to align interfering signals in time, frequency, or space. In MIMO networks, interference alignment uses the spatial dimension offered by multiple antennas for alignment. Users may coordinate their transmissions, using linear precoding, such that the interference signal lies in a reduced dimensional subspace at each receiver.

Assuming macro cellular networks it seems to be generally agreed that joint transmission is performance wise the superior solution compared to interference alignment. At the same time interference alignment requires more or less the same accuracy for the CSI (channel state information) information, but has the benefit of not requiring user data for precoding from the—potentially distributed—other cooperating eNBs.

So the idea of the method refers to the combination of the strength of both techniques. It is proposed as basic idea to switch to IF alignment instead of JP CoMP in case the backbone is overloaded and user data—required for JP CoMP—do not arrive at all cooperating eNBs in time. This can be seen as IF alignment as fallback mode for JP CoMP for the case of missing user data at one or several eNBs.

According to an embodiment of the invention, determining whether all user data of the user equipment being required for a precoding coordinated multipoint transmission is received by each of the base station and the at least one further base station comprises sending user data of the user equipment from the base station to the at least one further base station.

In the following, precoding coordinated multipoint transmission will be referred to as joint precoding coordinated multipoint transmission (JP-CoMP). However, it should be noted that also any other kind of precoding technique may be used. Furthermore, in the following, interference reducing transmission will be referred to as interference alignment (IFA).

However, it should be noted that also any other kind of interference reduction may be used which does not need the exchange of user data between base stations.

For performing JP-CoMP, all base stations within the CA may need the user data (i.e., the data of the user equipments being required for JP-COMP) of all user equipments (UEs) within the CA. For this, the base stations may send information comprising the user data to each other.

According to a further embodiment of the invention, determining whether all user data of the user equipment being required for a precoding coordinated multipoint transmission is received by the base station and the at least one further base station comprises receiving, by the base station, information from the further base station indicating whether all user data of the user equipment being required for a precoding coordinated multipoint transmission is received by the at least one further base station.

To ensure that all base stations have received all needed user data, the base stations may send information signals to each comprising an acknowledgement indicating that the user data has been received. If such an acknowledgement is not received, the base stations may determine that JP-CoMP may not be performed but IFA as fallback mode.

According to a further embodiment of the invention, determining whether all user data of the user equipment being required for a precoding coordinated multipoint transmission is received by each of the base station and the at least one further base station comprises determining whether all user data of the user equipment being required for a precoding coordinated multipoint transmission is received by each of the base station and the at least one further base station within a predefined time period.

The exchange of the user data may be delayed. If the user data is not received within a predefined time period, the base stations may decide to perform IFA instead of JP-CoMP to prevent a delay of the communication within the CA. A delay may in particular occur due to an overload of the overall system, or in particular due to an overload of the backbone. The backbone in this case may refer to any entities or control units being responsible for a communication between the base stations.

According to a further embodiment of the invention, interference alignment transmission is based on aligning interfering signals in time, frequency, space and/or code.

IFA may be based on aligning signals so that interferences may be reduced. This may be based on the idea to align signals in time, frequency, space and/or code in a way that interferences between these signals are (nearly) neutralized or cancelled out.

According to a further embodiment of the invention, the method further comprises exchanging user data between the base station and the at least one further base station.

The base stations may exchange, directly or indirectly, relevant user data. This may include control information for the user equipment. The user data are exchanged for all user equipments being assigned to the CA.

According to a further embodiment of the invention, exchanging user data between the base station and the at least one further base station is performed via a X2 control channel.

The base stations may each comprise an X2 interface for exchanging information. This may provide the advantage that information may be exchanged relatively quickly. However, not all user data may arrive in time and then IFA may be performed instead of JP-CoMP.

According to a further embodiment of the invention, determining whether all user data of the user equipment being required for a precoding coordinated multipoint transmission is received by each of the base station and the at least one further base station is repeated after a predefined time period.

According to this embodiment, the transmission mode may be adapted dynamically. If the overall system load changes, i.e., the backbone or the overall system is not overloaded anymore and thus, user data may be exchanged in time, the base stations may adapt the transmission mode based on this new determination. Vice versa, if the load is getting higher and thus the backbone may be overloaded, the base stations may switch from JP-CoM P to IFA.

According to a further embodiment of the invention, the method further comprises sending an information signal to the user equipment comprising information about the selected transmission mode.

The UE may be informed by the base station which transmission mode is selected. Thus, the UE may adapt its own transmitting and receiving behavior based on this information.

According to a further embodiment of the invention, sending an information signal to the user equipment comprises sending control information to the user equipment being indicative for the selected transmission mode per physical resource block.

The information of the selected transmission mode may also be included in control signals being provided to the UE via the PDCCH (physical downlink control channel). Thus, no additional signaling may be needed for informing the UE about the selected transmission mode.

According to a second aspect of the invention, there is provided a base station for configuring a communication channel between a base station and a user equipment within a cellular network system, the cellular network system comprising a cooperation area, wherein the base station and at least one further base station are assigned to the cooperation area, wherein the user equipment is served by the base station. The base station comprises a determination unit being adapted to determine whether all user data of the user equipment being required for a precoding coordinated multipoint transmission is received by each of the base station and the at least one further base station, a selection unit being adapted to select a transmission mode, wherein the transmission mode is based, if all user data of the user equipment being required for a precoding coordinated multipoint transmission is received by each of the base station and the at least one further base station, on precoding coordinated multipoint transmission, or else, on an interference reducing transmission, and a configuration unit being adapted to configure the communication channel between the base station and the user equipment based on the selected transmission mode.

The base station may be any type of access point or point of attachment, which is capable of providing a wireless access to a cellular network system. Thereby, the wireless access may be provided for a user equipment or for any other network element, which is capable of communicating in a wireless manner. The base station may be a NodeB, eNB, home NodeB or HeNB, or any other kind of access point. The base station may in particular be used for a B4G, LTE or 3GPP cell and communication, especially for forming cooperation areas.

The base station may comprise a receiving unit, for example a receiver as known by a skilled person. The base station may also comprise a transmitting or sending unit, for example a transmitter. The receiver and the transmitter may be implemented as one single unit, for example as a transceiver. The transceiver or the receiving unit and the sending unit may be adapted to communicate with the user equipment via an antenna. The base station may further comprise a X2 interface for exchanging information with the at least one further base station via a X2 connection.

The base station further comprises a determination unit, a selection unit and a configuration unit. The determination unit, the selection unit and the configuration unit may be implemented as single units or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The user equipment may further comprise a control unit for controlling and configuring the transmission based on information received from the base station being indicative for a selected transmission mode. The control unit may be implemented as a single unit or may be implemented for example as part of a standard control unit, like a CPU or a microcontroller.

According to a third aspect of the invention, there is provided a cellular network system. The cellular network system comprises a base station as described above.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for configuring a communication channel between a base station and a user equipment is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of configuring a communication channel between a base station and a user equipment. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

FIG. 3 shows a base station and a user equipment within a cellular network system according to an exemplary embodiment of the invention.

It is noted that in different figures, similar or identical elements are provided with the same reference signs.

DETAILED DESCRIPTION

In the following, embodiments of the herein disclosed subject matter are illustrated with reference to the drawings and reference to aspects of current standards, such as LTE, and their further developments. However, such reference to current standards is only exemplary and should not be considered as limiting the scope of the claims.

Figure 1:
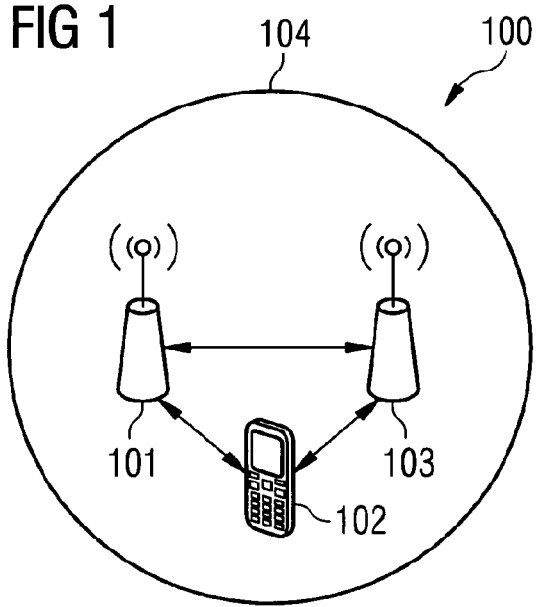
FIG. 1 shows a cellular network system according to an exemplary embodiment of the present invention.

FIG. 1 shows a cellular network system 100. The cellular network system comprises a cooperation area 104. A base station 101 and a further base station 103 are assigned to the cooperation area. A user equipment 102 is served by the base station 101.

The base station 101 determines whether all user data of the user equipment 102 being required for a joint precoding coordinated multipoint transmission is received by each of the base station 101 and the at least one further base station 103. Based on this, the base station 101 selects a transmission mode. If all user data of the user equipment 102 being required for a joint precoding coordinated multipoint (JP-CoMP) transmission is received by the base station 101 and the at least one further base station 103, the transmission mode is based on joint precoding coordinated multipoint transmission. Else, i.e., if not all user data being required for a joint precoding coordinated multipoint transmission is received by the base stations, the transmission mode is based on interference alignment transmission. Then, the base station 101 configures the communication channel between the base station 101 and the user equipment 102 based on the selected transmission mode. Also the further base station 103 configures the communication channel between the further base station 103 and the user equipment 102 based on the selected transmission mode. Thus, the base stations select the same transmission mode and transmit signals according to this transmission mode to the user equipment.

The goal of the described method is to combine the benefits of JP-CoMP with that of interference alignment (IFA). For JP-CoMP, cooperation should be possible over different sites (provided by one or more base stations or eNBs) to achieve significant performance gains. For the precoding, all involved eNBs require the channel state information (CSI) as well as the user data for all cooperating users. The distribution of the user and control information can be done over the so called X2—as well as S1 interface.

From an implementation point of view, one main challenge for JP CoMP is the distribution of huge amounts of user data over the backhaul with ultra short delay. For control information, one can setup a high priority connection providing a high probability to be available at all cooperating eNBs in time. For user data, prioritization is typically not possible or somehow meaningless due to the large amount of data. In that case, there is a certain probability that control information might be available at all eNBs of a so called cooperation area, while the according user data are still blocked somewhere in the backbone network.

When assuming macro cellular networks, it seems to be generally agreed that joint transmission is performance wise the superior solution compared to interference alignment. At the same time, interference alignment may require more or less the same accuracy for the CSI information, but may provide the benefit of not requiring user data for precoding from the—potentially distributed—other cooperating eNBs.

For combining the strength of both techniques, it is described according to the above mentioned method as basic idea to switch to IFA instead of JP-CoMP in case the backbone is overloaded and user data—required for JP-CoMP—do not arrive at all cooperating eNBs in time.

Figure 2:
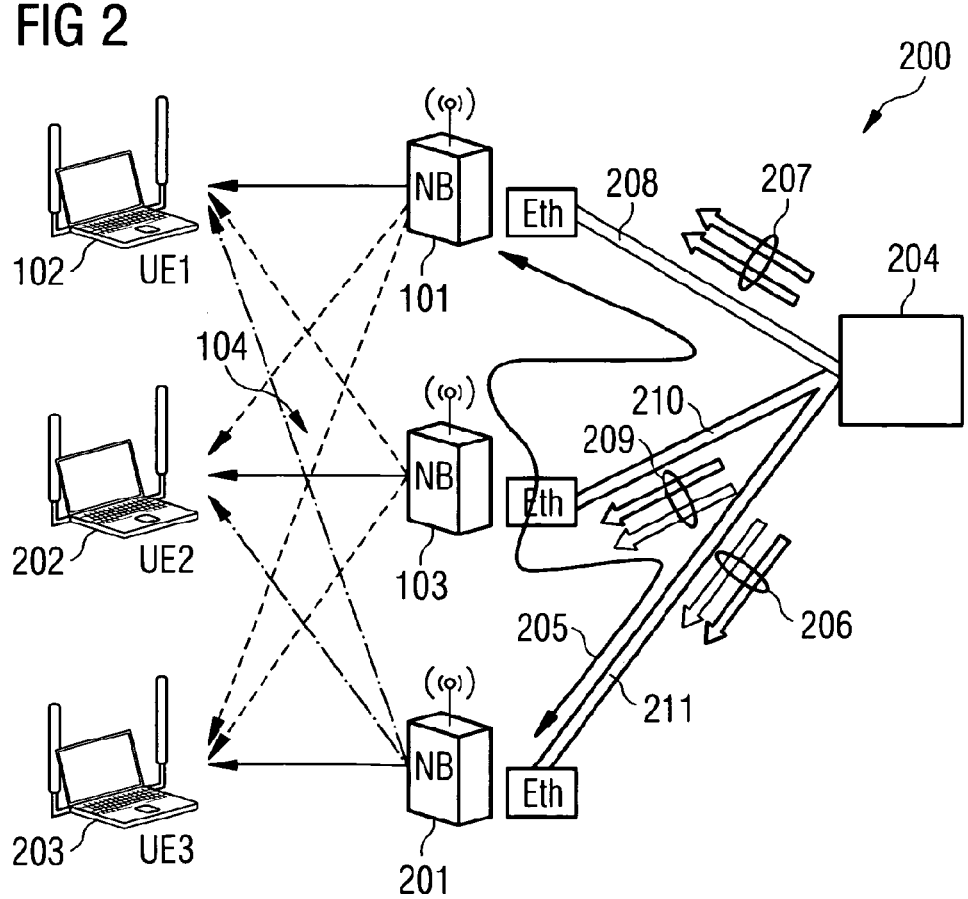
FIG. 2 shows a cellular network system according to a further exemplary embodiment of the present invention.

A typically envisaged scenario 200 is described in FIG. 2, illustrating a cooperation area of three distributed eNBs 101, 103, 201 connected to the backbone (here illustrated as central control unit 204), e.g., by Ethernet connections. In case of a distributed JP-CoMP implementation, the user data of all user equipments 102, 202, 203 being contained or stored at all eNBs have to be multicasted to all cooperating eNBs. For three eNBs, this may increase the data traffic on the backbone by a factor of 3 compared to conventional transmission.

In the backbone, traffic conditions might vary significantly depending on load conditions of all cells of the network. Without a costly strong over provisioning of network capacity, multicasting of user data to several eNBs—as required for JP-CoMP—may be unreliable and user data transmission may exhibit a strong delay variation. Therefore, a prioritization of different traffic components may be required. Highest priority might be given to the exchange of control information between the cooperating eNBs over the X2 interface and X2 links 205, like channel state information (CSI) or scheduling decisions. Due to the low amount of traffic and the high prioritization, there may be a near to 100% probability that the delay for these control information might be very small, i.e. <1 ms.

User data for the serving eNBs may be given second highest priority so that always at least single cell transmission is possible per eNB. These transmissions are indicated by arrows 208, 210 and 211, wherein the user data of UE 102 is transmitted to eNB 101 with the second highest priority, wherein the user data of UE 202 is transmitted to eNB 102 with the second highest priority, and wherein the user data of UE 203 is transmitted to eNB 201 with the second highest priority.

User data of other eNBs needed for the JP precoding are given lowest priority, which is more or less best effort leading to a certain probability that user data will arrive too late. These transmissions are indicated by arrows 206, 207 and 209, wherein arrow 206 indicates user data of user equipments 101 and 202, arrow 207 indicates user data of user equipments 202 and 203 and arrow 209 indicates user data of user equipments 101 and 203. As too late arrived user data are meaningless, these data may be discarded in the backbone after some time.

According to the herein described method each eNB may inform all other cooperating eNBs over the prioritized fast and reliable control link about the arrival of other eNB user data. In parallel, all CSI information may be exchanged over the same control channel between all cooperating eNBs. At certain predefined time instances—for instance short after arrival of the CSI information—all eNBs may check if they received from all other cooperating eNBs a message indicating that all user data have been arrived in time.

Based on this information, the eNBs may transmit, due to missing user data at any of the other eNBs, in IFA mode or,—if all user data are available at all eNBs—in JP-CoMP precoding mode. This may mean basically the selection of one or another predefined type of precoder for the user data.

UEs may receive quite different Rx (receive) signals depending on the precoding mode and therefore might have to be aware about the potentially two different transmission strategies. They might also have to know the specific applied IFA mode as there are many different implementation options like IFA over space, time, frequency or maybe even over codes.

So the eNBs may have to transmit at the beginning of the communication with an UE that IFA is used as fall back mode and the type of IFA if this is not already predefined.

During communication, the switching between fallback IFA and JP-CoMP may have to be done very quickly and at the latest possible moment to give all eNBs the chance to receive the user data.

To inform the UEs about the chosen mode, the PDCCH information might be accordingly extended, but this might lead to some extra delay for the precoding. This can be avoided, if the UEs are just doing a blind detection of the mode, i.e. try to demodulate mode 1 and 2 (IFA and JP-COMP) in parallel or successively and decide for the decodable one.

In case both modes fail, a HARQ retransmission may be needed. In that case, the HARQ retransmission might be enhanced by a mode information. Specifically, if in the meantime all user data have been arrived at all eNBs, the mode might be switched from IFA in the first to JP-CoMP for the second transmission. This would than lead to following extension HARQ messages for potential transmit combinations (first+second transmission):
 a) IFA+IFA transmission
 b) IFA+JP-CoMP transmission
 c) JP-CoMP+JP-ComP transmission According to the herein described method, IFA may be defined as fallback mode for JP-CoMP in case user data of all UEs of the cooperation area have not been arrived at all cooperating eNBs. A prioritized fast X2 control channel may be used to exchange status of user data arrival between all cooperating eNBs. In case all user data are available at all eNBs, JP precoding may be used otherwise IFA fallback mode. At setup of communication or as multicast/broadcast message, all UEs may be informed about IFA as fall back mode and the type of IFA being used in this case. Control information may be added to PDCCH informing UEs per PRB about the chosen transmission mode, or UEs may perform a blind decoding of the transmission mode based on knowledge of possible modes. An extension message for HARQ may be used for indicating modes in first and second transmissions.

The benefits of the described method and system may be a robust CoMP transmission self adapting to current backbone overload conditions, avoiding of the need for strong over provisioning of backbone capacity (potentially for rare use cases), exploiting of available backbone capacity to the largest possible extend, ensuring the shortest delay between CSI estimation and precoding to avoid the detrimental effects of feedback outdating.

FIG. 3 shows a cellular network system 300 according to an exemplary embodiment of the invention. The cellular network system comprises a base station 101 and a user equipment 102 being served by the base station. The cellular network system comprises a cooperation area, wherein the base station and at least one further base station are assigned to the cooperation area.

The base station 101 is adapted for configuring a communication channel between the base station and the user equipment 102. For this purpose, the base station comprises a determination unit 302, a selection unit 303 and a configuration unit 303.

The determination unit 302 is adapted to determine whether all user data of the user equipment being required for a joint precoding coordinated multipoint transmission is received by each of the base station and the at least one further base station. The selection unit 303 is adapted to select a transmission mode, wherein the transmission mode is based on, if all user data of the user equipment being required for a joint precoding coordinated multipoint transmission is received by each of the base station and the at least one further base station, joint precoding coordinated multipoint transmission, or else, on interference alignment transmission. The configuration unit 304 is adapted to configure the communication channel between the base station and the user equipment based on the selected transmission mode.

The base station may be any type of access point or point of attachment, which is capable of providing a wireless access to a cellular network system. Thereby, the wireless access may be provided for the user equipment, or for any other network element, which is capable of communicating in a wireless manner. The base station may be a NodeB, eNB, home NodeB or HeNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver 301. The transceiver or the receiving unit and the sending unit may be adapted to communicate with the user equipment via an antenna. The base station may further comprise a X2 interface for communicating with the at least one further base station via X2 links or connections.

The determination unit 302, the selection unit 303 and the configuration unit 304 may be implemented as single units or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver 305. The transceiver or the receiver and the transmitting unit may be adapted to communicate with the base station via an antenna.

The user equipment may further comprise a control unit 306 for controlling and configuring the transmission based on information received from the base station being indicative for the selected transmission mode. The control unit may be implemented as a single unit or may be implemented for example as part of a standard control unit, like a CPU or a microcontroller.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the determination unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularities on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Base station
102 User equipment
103 Further base station
104 Cooperation area
201 Further base station
202 User equipment
203 User equipment
204 Central control unit
205 X2 links
206 User data of user equipments 101, 202
207 User data of user equipments 202, 203
208 User data of user equipment 101
209 User data of user equipments 101, 203
210 User data of user equipment 202
211 User data of user equipment 203
300 Cellular network system
301 Transceiver of the base station
302 Determination unit of the base station
303 Selection unit of the base station
304 Configuration unit of the base station
305 Transceiver of the user equipment
306 Control unit of the user equipment

The invention claimed is:

1. A method for configuring a communication channel between a base station and a user equipment within a cellular network system, the cellular network system comprising a cooperation area, wherein the base station and at least one further base station are assigned to the cooperation area, wherein the user equipment is served by the base station, the method including a processor configured to execute instructions to perform a method, the method comprising
determining, by the base station, whether all user data of the user equipment being required for a precoding coordinated multipoint transmission is received by each of the base station and the at least one further base station,
selecting a transmission mode, wherein the transmission mode is based,
if all user data of the user equipment being required for a precoding coordinated multipoint transmission is received by each of the base station and the at least one further base station, on precoding coordinated multipoint transmission, or
else, on an interference reducing transmission, and
configuring, by the base station, the communication channel between the base station and the user equipment based on the selected transmission mode.

2. The method as set forth in claim 1, wherein the precoding coordinated multipoint transmission corresponds to a joint precoding coordinated multipoint transmission.

3. The method as set forth in claim 1, wherein the interference reducing transmission corresponds to an interference alignment transmission.

4. The method as set forth in claim 1, wherein determining whether all user data of the user equipment being required for a precoding coordinated multipoint transmission is received by each of the base station and the at least one further base station comprises
sending user data of the user equipment being required for a precoding coordinated multipoint transmission from the base station to the at least one further base station.

5. The method as set forth in claim 1, wherein determining whether all user data of the user equipment being required for a precoding coordinated multipoint transmission is received by each of the base station and the at least one further base station comprises
receiving, by the base station, information from the further base station indicating whether all user data of the user equipment being required for a precoding coordinated multipoint transmission is received by the at least one further base station.

6. The method as set forth in claim 1, wherein determining whether all user data of the user equipment being required for a precoding coordinated multipoint transmission is received by each of the base station and the at least one further base station comprises determining whether all user data of the user equipment being required for a precoding coordinated multipoint transmission is received by each of the base station and the at least one further base station within a predefined time period.

7. The method as set forth in claim 1, wherein interference reducing transmission is based on aligning interfering signals in time, frequency, space and/or code.

8. The method as set forth in claim 1, further comprising exchanging user data between the base station and the at least one further base station.

9. The method as set forth in claim 8, wherein exchanging user data between the base station and the at least one further base station is performed via a X2 control channel.

10. The method as set forth in claim 1, wherein determining whether all user data of the user equipment being required for a precoding coordinated multipoint transmission is received by each of the base station and the at least one further base station is repeated after a predefined time period.

11. The method as set forth in claim 1, the method further comprising sending an information signal to the user equipment comprising information about the selected transmission mode.

12. The method as set forth in claim 11, wherein sending an information signal to the user equipment comprises sending control information to the user equipment being indicative for the selected transmission mode for one physical resource block, for parts of one physical resource block and/or for a plurality of physical resource blocks.

13. A base station for configuring a communication channel between a base station and a user equipment within a cellular network system, the cellular network system comprising a cooperation area, wherein the base station and at least one further base station are assigned to the cooperation area, wherein the user equipment is served by the base station, the base station comprising
at least one processor, and
instructions recorded on a non-transitory computer-readable medium, and executable by the at least one processor, the base station further comprising
a determiner to determine whether all user data of the user equipment being required for a precoding coordinated multipoint transmission is received by each of the base station and the at least one further base station,
a selector to select a transmission mode, wherein the transmission mode is based,
if all user data of the user equipment being required for a precoding coordinated multipoint transmission is received by each of the base station and the at least one further base station, on precoding coordinated multipoint transmission, or
else, on an interference reducing transmission, and
a configurer to configure the communication channel between the base station and the user equipment based on the selected transmission mode.

14. The base station as set forth in claim 13, wherein the precoding coordinated multipoint transmission corresponds to a joint precoding coordinated multipoint transmission.

15. The base station as set forth in claim 13, wherein the interference reducing transmission corresponds to an interference alignment transmission.

16. The base station as set forth in claim 13, wherein the determination unit of the base station being adapted to determine whether all user data of the user equipment being required for a precoding coordinated multipoint transmission is received by each of the base station and the at least one further base station comprises
the base station adapted to send user data of the user equipment being required for a precoding coordinated multipoint transmission from the base station to the at least one further base station.

17. The base station as set forth in claim 13, wherein the determination unit of the base station being adapted to determine whether all user data of the user equipment being required for a precoding coordinated multipoint transmission is received by each of the base station and the at least one further base station comprises
the base station adapted to receive information from the further base station indicating whether all user data of the user equipment being required for a precoding coordinated multipoint transmission is received by the at least one further base station.

18. The base station as set forth in claim 13, wherein the interference reducing transmission is based on aligning interfering signals in time, frequency, space and/or code.

19. The base station as set forth in claim 13, wherein the base station is further adapted to send an information signal to the user equipment comprising information about the selected transmission mode.

20. A computer program product, the computer program product being tangibly embodied on a non-transitory computer-readable storage medium and including instructions that, when executed, are configured to cause at least one processor to perform a method for configuring a communication channel between a base station and a user equipment within a cellular network system, the cellular network system comprising a cooperation area, wherein the base station and at least one further base station are assigned to the cooperation area, wherein the user equipment is served by the base station, the method comprising
determining, by the base station, whether all user data of the user equipment being required for a precoding coordinated multipoint transmission is received by each of the base station and the at least one further base station,
selecting a transmission mode, wherein the transmission mode is based,
if all user data of the user equipment being required for a precoding coordinated multipoint transmission is received by each of the base station and the at least one further base station, on precoding coordinated multipoint transmission, or
else, on an interference reducing transmission, and
configuring, by the base station, the communication channel between the base station and the user equipment based on the selected transmission mode.

* * * * *